(12) United States Patent
Menck

(10) Patent No.: US 6,948,821 B2
(45) Date of Patent: Sep. 27, 2005

(54) MIRROR FOR REFLECTING ELECTROMAGNETIC RADIATION AS WELL AS ILLUMINATION AND IMAGING METHOD EMPLOYING THE SAME

(75) Inventor: Alexander Menck, Aalen (DE)

(73) Assignee: Carl Zeiss SMT AG, Oberkochen (DE)

(*) Notice: Subject to any disclaimer, the term of this patent is extended or adjusted under 35 U.S.C. 154(b) by 220 days.

(21) Appl. No.: 10/200,467

(22) Filed: Jul. 22, 2002

(65) Prior Publication Data

US 2003/0030922 A1 Feb. 13, 2003

(30) Foreign Application Priority Data

Jul. 23, 2001 (DE) ........................................ 101 35 806

(51) Int. Cl.$^7$ .............................................. G02B 7/182
(52) U.S. Cl. ...................... 359/846; 359/847; 359/848; 359/849
(58) Field of Search ................................ 359/846–849, 359/223, 224; 310/26, 83, 328, 331; 250/201.9; 338/2, 3

(56) References Cited

U.S. PATENT DOCUMENTS

| | | | | |
|---|---|---|---|---|
| 3,800,264 A | * | 3/1974 | Kurtz et al. .................... | 338/2 |
| 4,739,298 A | * | 4/1988 | Kurtz et al. .................... | 338/2 |
| 4,959,531 A | * | 9/1990 | Marino ..................... | 250/201.9 |
| 5,022,745 A | * | 6/1991 | Zayhowski et al. .......... | 350/608 |
| 5,210,653 A | * | 5/1993 | Schell ......................... | 359/846 |
| 5,357,825 A | | 10/1994 | Costello et al. ............. | 74/479 P |
| 5,508,840 A | | 4/1996 | Vogel et al. ................. | 359/291 |
| 5,511,428 A | | 4/1996 | Goldberg et al. ............. | 73/777 |
| 5,517,280 A | | 5/1996 | Quate .......................... | 355/71 |
| 5,802,223 A | | 9/1998 | Nashimoto ..................... | 385/8 |
| 6,001,666 A | | 12/1999 | Diem et al. .................... | 438/52 |
| 6,062,088 A | | 5/2000 | Ingrisch et al. ............... | 73/727 |
| 6,108,118 A | | 8/2000 | Minamoto ................... | 359/224 |
| 6,108,121 A | | 8/2000 | Mansell et al. ............. | 359/291 |
| 6,124,148 A | | 9/2000 | Shinogi et al. ............... | 438/52 |
| 6,234,027 B1 | | 5/2001 | Schatz ......................... | 73/754 |
| 6,261,859 B1 | | 7/2001 | Ouchi .......................... | 438/39 |
| 6,408,015 B1 | | 6/2002 | Kaneko ....................... | 372/50 |
| 6,475,153 B1 | | 11/2002 | Khair et al. ................. | 600/485 |

FOREIGN PATENT DOCUMENTS

| | | | | |
|---|---|---|---|---|
| DE | 42 11 898 A1 | 10/1993 | ............. | H01S/3/08 |
| DE | 198 33 712 A1 | 1/1999 | ............. | G01L/9/04 |
| DE | 100 46 379 A1 | 3/2002 | ............. | G02B/7/04 |

OTHER PUBLICATIONS

German Patent Abstract Publication No. DE4211898, Publication Date: Oct 28, 1993, 1 page.
German Patent Abstract, Publication No. DE 10046379, Publication Date: Apr. 25, 2002, 1 page.
German Patent Abstract, Publication No. DE19833712, Publication Date: Nov. 15, 2001, 1 page.*

* cited by examiner

Primary Examiner—Mohammad Sikder
(74) Attorney, Agent, or Firm—Osha & May L.L.P.

(57) ABSTRACT

A mirror arrangement for reflecting electromagnetic radiation has a mirror body with a mirror side disposed towards the radiation to be reflected and at least one extension sensor located at the mirror body for detecting a deformation state of the mirror body. The mirror body includes semiconductor layer where the at least one extension sensor is located.

16 Claims, 2 Drawing Sheets

US 6,948,821 B2

MIRROR FOR REFLECTING ELECTROMAGNETIC RADIATION AS WELL AS ILLUMINATION AND IMAGING METHOD EMPLOYING THE SAME

FIELD OF THE INVENTION

The invention relates to a mirror for reflecting electromagnetic radiation as well as to an illumination and imaging method employing such a mirror.

BACKGROUND OF THE INVENTION

In particular, the invention relates to a mirror for use in a so-called adaptive optical system, wherein disturbances of wavefronts of the radiation reflected by the mirror are compensated for, for example, by operation of actuators which act upon the mirror or other components of the optical system, said disturbances being caused by deformations of a mirror surface of the mirror or other components of the optical system. Such deformations of the mirror surface may, for example, be caused by temperature influences which change over time or by mechanical influences.

In order to detect changes in a deformation state of a mirror, usually extensometers are employed which are adhered to a side of a mirror substrate opposite to the mirror surface. Measuring signals obtained from the extensometers are approximately representative of the deformation state of the mirror. However, the exact deformation state of the mirror cannot be detected with a sufficiently high accuracy as it would be desired, because the connection between the extensometer and the mirror is inadequate since the adhesive layer is disposed therebetween. Due to the adhesive layer, the extensometer may creep relative to the mirror substrate which results into measurement deviations, among others, in the form of hysteresis.

SUMMARY OF THE INVENTION

It is an object of the present invention to provide a mirror for reflecting electromagnetic radiation which comprises at least one extension sensor which reflects a deformation state of the mirror with increased accuracy.

Furthermore, it is an object of the invention to provide an illumination method which enables to compensate for changes in a wavefront of the reflected radiation with increased accuracy.

In this respect, the invention proceeds from a mirror for reflecting electromagnetic radiation comprising a mirror body with a mirror side disposed towards the radiation to be reflected, wherein at least one extension sensor is provided at the mirror body for detecting a deformation of the mirror side.

According to the invention, the mirror is distinguished in that the mirror body comprises a semiconductor layer at which the at least one extension sensor is provided.

The semiconductor layer is integrally formed with the mirror body and supports the at least one extension sensor, as a result of which the at least one extension sensor is also integrally formed with the mirror body and is capable of directly detecting the deformation state thereof.

Preferably, a plurality of extension sensors are distributed in projection to the mirror surface. As all extension sensors are integrally formed with the mirror body, it is excluded as it is the case with adhered extensometers that, as a result of creeping, different extension sensors differently yield to a changing deformation state of the mirror body. Preferably, the surface of the mirror which is effective for the reflection of the radiation is only insignificantly larger than the surface area of the mirror body provided with extension sensors. Preferably, the region of the mirror body provided with extension sensors has a surface area which is larger than 50%, preferably, larger than 80% and, most preferred, larger than 100% of the mirror surface effective for the reflection of the radiation.

According to a preferred embodiment of the invention, the at least one extension sensor is incorporated into the semiconductor layer by doping certain regions thereof. However, it is also possible to form the at least one extension sensor on the semiconductor layer by means of a lithographic process.

Preferably, the semiconductor layer is a monocrystalline semiconductor layer, in particular, of silicon.

The extension sensors are then formed of the semiconductor material which is doped such that the semiconductor material exhibits a determinable piezo-resistive coefficient in the region of the extension sensor, which piezo-resistive coefficient is preferably as high as possible. The doping may be a p-type doping, in particular, with an element of the main group III, preferably, boron. However, the doping may also be an n-type doping, in particular, with an element of the main group V, preferably, phosphorous or arsenic.

In order to achieve a reflection of the radiation which is as efficient as possible, the mirror side of the mirror body is provided with one or more mirror layers. This may be, for example, a metallizing layer comprising, for example, gold. However, multi-layer structures formed of, for example, different dielectric or metallic materials may also be employed. In this respect, the thickness of the individual layers can be adapted to the wavelength of the radiation to be reflected.

The semiconductor layer may also constitute the main supporting structure of the mirror body and itself provides the reflecting surface, or the mirror layer may be applied substantially directly to the semiconductor layer, wherein one or more bonding layers can be provided between the semiconductor layer and the mirror layer.

However, it is also preferred for the mirror body to comprise a backing layer which is fixedly connected to the semiconductor layer over the whole surface thereof. This backing layer then constitutes the main supporting structure of the mirror body, and a thickness of the semiconductor layer can be selected to be correspondingly thinner, thus allowing a less expensive manufacture of the mirror.

In this respect, it is preferred for the backing layer to have a low temperature-dependent length extension coefficient. Moreover, it is preferred for the temperature-dependent length extension coefficient of the backing layer to be substantially equal to or less than the temperature-dependent length extension coefficient of the material of the semiconductor layer. A preferred material for the backing layer is glass and, in particular, a glass type which is available under the trade name Zerodur.

Preferably, the semiconductor layer is grown on the backing layer by means of a deposition process, preferably, by means of a CVD process or an epitaxial deposition process. However, it is also preferred to fixedly connect a prefabricated semiconductor layer to the backing layer, for example, by means of a diffusion process.

With a view to the use of the mirror in an adaptive optical system, moreover, a control is provided for detecting measuring signals of the at least one extension sensor. The control then supplies a deformation signal in response to said measuring signals, which deformation signal is representative of the deformation state of the mirror. The deformation signal can then further be used, for example, to control actuators which act upon the wavefronts of the radiation to be reflected or the radiation reflected by the mirror by changing the deformation state of the mirror. These actuators can act upon optical components of the system which are different from the mirror.

However, it is preferred for the mirror itself to comprise such actuators which change the deformation state of the mirror and are controlled by the control in response to the deformation signal.

Moreover, according to the invention, there is also provided an illumination and imaging method for operating such a mirror, wherein the control is operated such that it controls the actuators such that the mirror assumes a desired predetermined deformation state.

BRIEF DESCRIPTION OF THE DRAWINGS

Embodiments of the invention are described in further detail below with reference to the accompanying drawings, wherein.

DETAILED DESCRIPTION

A first embodiment of the mirror arrangement of the invention is described below with reference to FIGS. 1 to 3.

Figure 1:
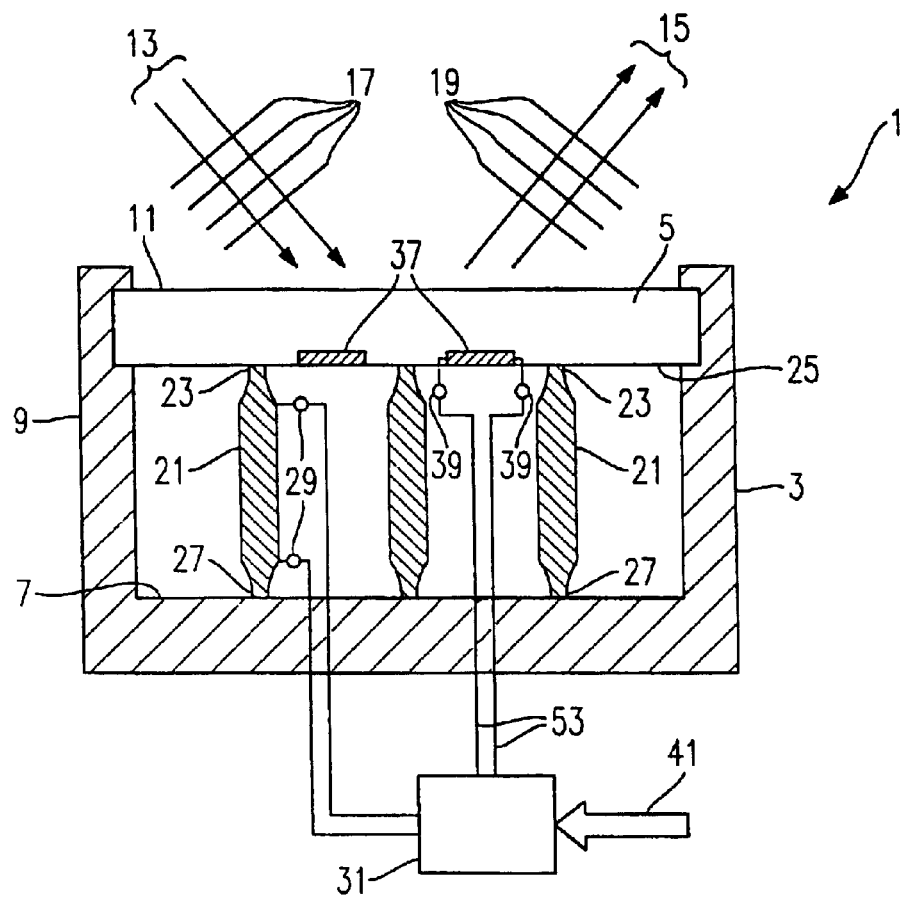
FIG. 1 is a cross-sectional view of an embodiment of a mirror arrangement according to the invention.

FIG. 1 is a cross-sectional view of a mirror arrangement 1 comprising a can-shaped support 3 for fixing a circular mirror body 5 in position spaced apart from a bottom 7 of the support 3 in the region of a front surface of walls 9 of the support 3. The mirror body 5 has a mirror side 11 on which electromagnetic radiation 13 to be reflected impinges and which returns the same as reflected electromagnetic radiation 15. Symbolically represented wavefronts 17 of the incident radiation 13 are reflected by the mirror 11 as wavefronts 19 which only have the same shape as the wavefronts 17 if the mirror surface 11 is of completely planar configuration. Even if the mirror body 5 has been manufactured with such a planar mirror surface 11, the mirror body, and thus the mirror surface 11, may still be deformed due to mechanical influences imposed by the support 3 or due to changing temperature influences, which results into a disturbance of the wavefronts 19 of the reflected radiation 15.

As a countermeasure, a plurality of actuators 21 is provided. Each actuator 21 abuts with its one end 23 against a rear side 25 of the mirror body disposed away from the mirror side 11 and with its other end 27 against the bottom of the support 3. Each actuator 21 comprises terminals 29 (only the left actuator 21 in FIG. 1 is shown to have such terminals) through which an adjustable electric voltage is supplied to the actuator 21 by means of a control 31. The actuator 21 comprises a group of piezoelectric elements such that a distance between the ends 23 and 27 of the actuator is variable in response to the voltage supplied by the control 31. As a result, through the control of the control 31, each actuator 21 can impart, at the point where its end 23 abuts against the rear side 25 of the mirror, a force to the mirror body 5 which is directed orthogonally to the mirror surface 11. By changing the forces imparted by the actuators 21, it is thus possible, due to the elasticity of the mirror body 5, to change the deformation state thereof.

A change in the deformation state of the mirror body 5, in turn, results into a change in the internal tension in the material of the mirror body and thus also into a change in the extension or compression of the material in the region of the rear side 25 of the mirror body 5. In order to detect such changes in the extension or compression of the material, the mirror body 5 is integrally formed with a plurality of extension sensors 37. Each extension sensor 37 comprises terminals 39 for supplying a measuring signal representative of the extension or compression of the material to the control 31 via connecting lines 53 (only one extension sensor is shown in FIG. 1 to comprise the terminals and lines connecting to the control).

The operation of the mirror arrangement is as follows:

First, those measuring signals of the extension sensors 37 are determined which are obtained when the mirror body is in a desired deformation state. For example, the desired deformation state may be a state in which the mirror surface 11 is absolutely planar. However, the desired deformation state may also be such a state in which the mirror surface 11 is different from a planar surface, for example, in order to deform the wavefronts 19 of the reflected radiation 15 in a desired manner as compared to the wavefronts 17 of the incident radiation 13. The desired deformation state can be effected by actuating the actuators 21 when the mirror body 11 is mounted in the support 3, or it can also be effected in a different manner, for example, when the mirror body 5 is not mounted in the support.

The measuring signals obtained in a desired deformation state by the extension sensors 37 are supplied to the control 31 as nominal measuring signals or as a data set 41 which is representative of the same. During operation of the mirror arrangement 1, the control 31 compares the measuring signals provided by the extension sensors 37 with the respective nominal measuring signals and then operates the actuators 21 such that the current measuring signals correspond, if possible, to the nominal measuring signals. If, during operation of the mirror arrangement, changes in the deformation state of the mirror body 5 occur, for example, due to temperature changes, such changes in the deformations state are detected by the control on account of the measuring signals provided by the extension sensors 37 and compensated for by correspondingly actuating the actuators 21 such that the mirror body 5 returns to the desired deformation state.

A field of application for the operation of the mirror arrangement 1 is, for example, in a process for the manufacture of a miniaturized device and, here, in particular, in a lithographic process. In such a process, the mirror arrangement can be employed, for example, in an illumination system for illuminating a mask or in an imaging system for imaging structures of the mask onto a radiation-sensitive layer of a substrate.

Figure 2:
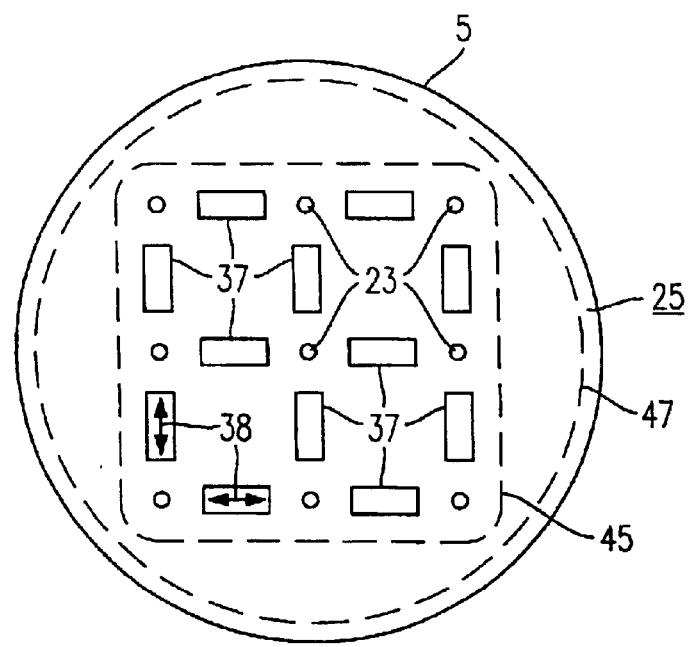
FIG. 2 is a plan view of a mirror body of the embodiment shown in FIG. 1.

FIG. 2 is a plan view of the rear side 25 of the mirror body 5. It is apparent that, in the described mirror arrangement 1, nine actuators 21 are supported with its ends 23 at the rear side 25, the support points 23 being arranged at the rear side 25 in a regular lattice. Between each pair of adjacent support points 23, there is provided an elongated extension sensor 37, so that a total of twelve extension sensors 37 is provided for detecting the deformation state of the mirror body 5 approximately over a surface area 45 which is indicated in FIG. 2 in broken line. In FIG. 2, there is depicted by a further broken line an optically effective region 47 of the mirror surface 11 which, due to the support 3, is slightly smaller than the entire cross-sectional area of the mirror body 5.

What is important here is that, due to the extension sensors 37 being integrally formed with the mirror body 5, the area 45 of the mirror body 5 is detected for extension changes and that said area is only insignificantly smaller than the area 47 which is effective for reflecting the radiation. As a result, regions which are effective for the reflection and not detected for changes in the deformation state are merely of comparatively small size. In this respect, it is also possible to reduce the region 47 which is effective for the reflection, for example, by providing aperture filters or by correspondingly shaping the incident or exiting beam, and this, in particular, in such a way that the reflecting area 47 lies fully in the area 45 detected by the extension sensors 37.

Each extension sensor 37 has a preference direction, designated by reference number 38 in the Figures, in which the extension sensor is sensitive to extension changes. In order to detect deformation state changes in the detected surface area 45 as completely as possible, the extension sensors 37 are arranged in said area with their preference directions 38 being oriented differently.

The mirror body 5 is formed of a silicon monocrystal which is oriented such that the mirror surface 11 is provided by a (100)-surface of the monocrystal. The extension sensors 37 are integrally formed with the mirror body 5 in that the extension sensors 37 are incorporated into the mirror body 5 at the rear side 25 thereof as doping of the silicon. In the present case, boron is selected as doping agent in such a concentration that the silicon has a sufficiently high piezo-resistive coefficient in the doped region for detecting changes in the deformation state of the silicon body by means of the control 31. The doping agent can be incorporated using conventional techniques, such as ion implantation with a kinetic energy of, for example, 80 keV or diffusion under heat.

Doping doses of from $10^{12}$ cm$^{-2}$ to $10^{16}$ cm$^{-2}$ can be selected, for example, $5 \times 10^{14}$ cm$^{-2}$. The doping concentration may be in the range of from $10^{17}$ cm$^{-3}$ to $10^{21}$ cm$^{-3}$, for example, $10^{19}$ cm$^{-3}$, and that with a depth of the doped region of from 0.1 $\mu$m to 1.0 $\mu$m, preferably, 0.4 $\mu$m to 0.7 $\mu$m.

Figure 3:
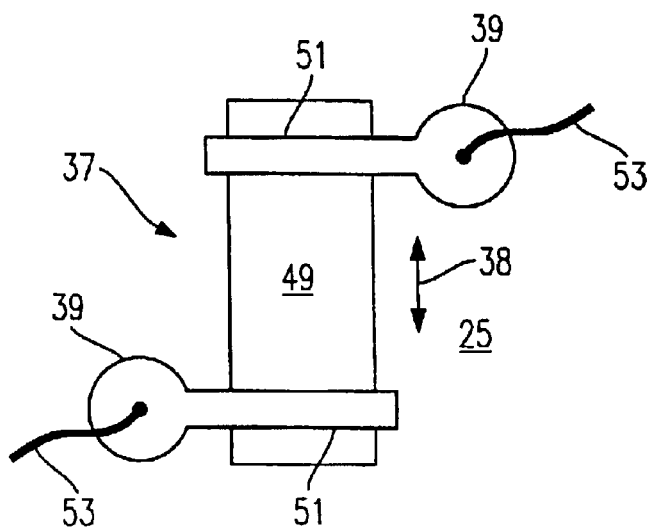
FIG. 3 is a detailed view of an extension sensor depicted on the mirror body of FIG. 2 and FIGS. 4a–4d show a method for manufacturing a further embodiment of the mirror arrangement of the invention.

An extension sensor 37 is shown enlarged in size in FIG. 3 in plan view of the rear side 25 of the silicon monocrystal 5. The doped elongated-rectangular region is designated by reference sign 49. At spaced apart end portions of the doped region 49, there are applied metallizations 51 on the rear side 25 of the monocrystal 25 to form the terminals 39. Line inlets 53 are connected to the terminals 39 to connect to the control 31.

In the following, variants of the embodiments described with reference to FIGS. 1 to 3 are described. Components which correspond to each other in structure and function are designated by the same references signs as in FIGS. 1 to 3, however, supplemented by an additional letter for the purpose of distinction. For the purpose of illustration, reference is made to the entire preceding description.

A method for manufacturing a variant of the mirror body shown in FIG. 1 is depicted in FIG. 4.

Figure 4A:
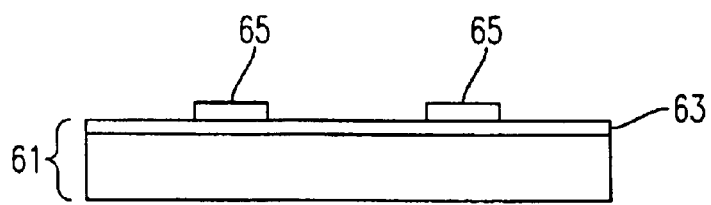
Figure 4B:
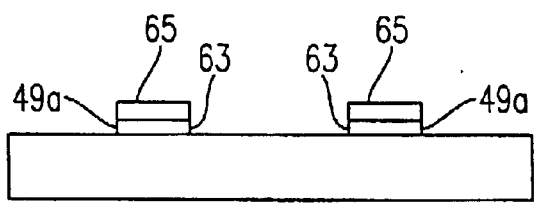
Figure 4C:
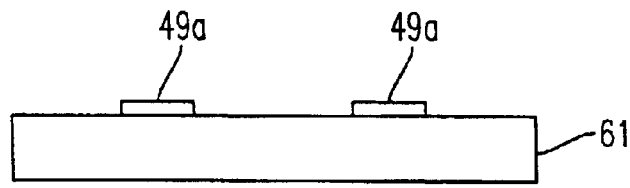

In order to manufacture a mirror body 5*a*, first, boron is diffused into a silicon monocrystal 61 on a side which later forms the rear side 25*a* of the mirror body 5*a* in order to form a boron-doped layer 63 in the crystal 61. Subsequently, a mask material 65 is applied to the boron-doped layer 63 in the regions which later form piezo-resistive regions 49*a* of the extension sensors (FIG. 4*a*). Then, those regions of the doped layer 63 which are not covered by mask material 65 are etched away (FIG. 4*b*). Subsequently, the mask material 65 is likewise etched away so that the doped regions 49*a* are exposed (FIG. 4*c*) and can be contacted to finish the extension sensors.

Figure 4D:
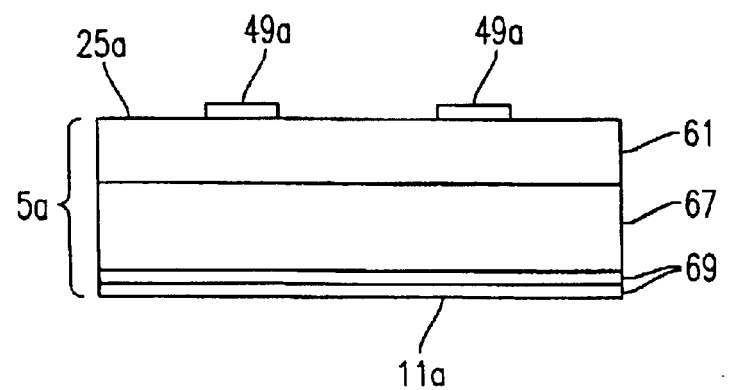

Subsequently, the silicon crystal 61 with the doped regions 49*a* for the extensions sensors applied thereto is connected to a glass substrate 67 over its entire surface. The temperature dependent length extension coefficient of the glass substrate 67 is as low as possible and, to this end, the latter is formed of a glass material which is available under the trade name Zerodur. The surface 11*a* which is not connected to the glass substrate 67 is then mechanically polished to provided a surface of desired optical quality. A plurality of layers of dielectric material is then vapor-deposited onto said surface. As material for these layers 69, of which only two are shown in FIG. 4*d* for reasons of simplicity, silicon and molybdenum are alternately used with such a thickness that a mirror is provided which reflects radiation of a wavelength of 13 nm with high efficiency.

In the mirror body 5*a* having a diameter of 100 mm, the glass substrate 67 is the main supporting component, so that the silicon crystal may have a relatively low thickness of 200 $\mu$m.

As an alternative to the dielectric multi-layer configuration 69, it is also possible to provide a metallizing layer on the substrate 67 to reflect the radiation. Equally, in the embodiment shown in FIG. 1, a dielectric multi-layer or a metallizing layer can also be applied.

Moreover, it is also possible to use materials other than glass for the backing layer 67. Moreover, it is also possible to use a semiconductor material other than silicon to diffuse the extension sensors thereinto or to etch the same from the semiconductor material.

It is also contemplated to use not only a monocrystalline but also a polycrystalline semiconductor material. For example, a polycrystalline silicon layer may be grown on a backing material to form the mirror body. The extension sensors are then either diffused into the polycrystalline material or etched away therefrom, so that, in this case, too, the extension sensors are integrally formed with the mirror body.

It is also possible to arrange the extension sensors in a different pattern and in a different number at the mirror body than it is shown in FIG. 2. For example, a pattern may be provided, wherein a group of extension sensors detects voltage changes in radial direction of the mirror, and another group of extension sensors detects voltage changes in circumferential direction around a mirror center at different radii.

In the embodiment of FIG. 3, the terminals for the doped regions of the semiconductor material are formed as metallizations. However, it is also possible, to provide said terminals by regions of the semiconductor material which are particularly highly doped so that these regions have a low electric resistance and a high electric conductivity, respectively, and exhibit no significant piezo-resistive effect with a view to the application.

In the above-described exemplary embodiments, the extension sensors are formed on the rear side of the mirror body disposed away from the reflective side of the same. However, it is also possible to form the extension sensors on the reflective side of the mirror body. Here, in particular, the already doped semiconductor surface can also be polished to optical quality, a radiation-reflecting layer can be applied and the terminal lines for the extension sensors can be provided such that they substantially do not affect the incident and reflected radiation. In particular, the terminal lines can be provided such that they are transparent to radiation.

What is claimed is:

1. A mirror arrangement for reflecting electromagnetic radiation, comprising:

a mirror body with a mirror side disposed towards the radiation to be reflected, wherein at least one extension sensor is provided at the mirror body for detecting a deformation state of the mirror body, wherein the mirror body comprises a semiconductor layer at which the at least one extension sensor is provided.

2. The mirror arrangement according to claim 1, wherein the at least one extension sensor is incorporated into the semiconductor layer by doping regions of the semiconductor layer.

3. The mirror arrangement according to claim 1, wherein the at least one extension sensor is formed on the semiconductor layer by a lithographic process.

4. The mirror arrangement according to claim 1, wherein the semiconductor layer is a monocrystalline silicon layer.

5. The mirror arrangement according to claim 1, wherein a plurality of extension sensors is distributed spaced apart from one another in a surface area of the semiconductor layer.

6. The mirror arrangement according to claim 5, wherein the surface area in which the plurality of extension sensors is arranged is larger than 0.5 times the size of an optically effective area of the mirror.

7. The mirror arrangement according to claim 1, wherein the mirror body comprises a backing layer which is fixedly connected to the semiconductor layer over the entire surface thereof.

8. The mirror arrangement according to claim 7, wherein a material of the backing layer has a temperature-dependent length extension coefficient which is substantially equal to or less than a temperature-dependent length extension coefficient of a material of the semiconductor layer.

9. The mirror arrangement according to claim 7, wherein the backing layer is formed of glass.

10. The mirror arrangement according to claim 7, wherein the semiconductor layer is grown on the backing layer by a deposition process.

11. The mirror arrangement according to claim 1, further comprising a plurality of dielectric layers provided on the mirror side of the mirror body.

12. The mirror arrangement according to claim 1, further comprising a controller for detecting measuring signals of the at least one extension sensor and for outputting at least one deformation signal which is representative of the deformation state of the mirror body.

13. The mirror arrangement according to claim 12, further comprising at least one actuator for changing the deformation state of the mirror body, wherein the controller is configured to control the actuator in response to the deformation signal.

14. The mirror arrangement according to claim 5, wherein a first extension sensor of the plurality of extension sensors is configured to detect a change of extension oriented in a first direction and wherein a second extension sensor of the plurality of extension sensors is configured to detect a change of extension oriented in a second direction oriented transversally to the first direction.

15. A method for reflecting electromagnetic radiation comprising:

providing a mirror body with a mirror side disposed towards the radiation to be reflected, wherein at least one extension sensor is provided at the mirror body for detecting a deformation state of the mirror body, and wherein the mirror body comprises a semiconductor layer at which the at least one extension sensor is provided; and detecting a deformation state of the mirror body based on a signal generated by the at least one extension sensor.

16. The method according to claim 15, wherein the at least one extension sensor is incorporated into the semiconductor layer by doping regions of the semiconductor layer.

* * * * *